United States Patent
Martin et al.

(10) Patent No.: US 6,631,275 B1
(45) Date of Patent: Oct. 7, 2003

(54) METHOD FOR ACCELERATING CALL ESTABLISHMENT IN A RADIO COMMUNICATION SYSTEM

(75) Inventors: Markus Martin, Helsinki (FI); Heikki Tuunanen, Espoo (FI)

(73) Assignee: Nokia Corporation, Espoo (FI)

( * ) Notice: Subject to any disclaimer, the term of this patent is extended or adjusted under 35 U.S.C. 154(b) by 6 days.

(21) Appl. No.: 09/593,651

(22) Filed: Jun. 13, 2000

Related U.S. Application Data

(63) Continuation of application No. PCT/FI98/00995, filed on Dec. 18, 1998.

(30) Foreign Application Priority Data

Dec. 19, 1997 (FI) .................................. 974584

(51) Int. Cl.⁷ ................................ H04B 1/38
(52) U.S. Cl. .................... 455/560; 455/433; 455/517
(58) Field of Search ................ 455/517, 403, 455/410, 411, 414, 406, 422, 450, 509, 550, 560, 401, 554, 433

(56) References Cited

U.S. PATENT DOCUMENTS

| | | | | |
|---|---|---|---|---|
| 5,297,183 A | * | 3/1994 | Bareis et al. | 455/410 |
| 5,778,313 A | * | 7/1998 | Fougnies | 455/406 |
| 5,953,676 A | * | 9/1999 | Berry et al. | 455/403 |
| 6,032,034 A | * | 2/2000 | Rabina et al. | 455/401 |
| 6,240,277 B1 | * | 5/2001 | Bright | 455/554 X |

FOREIGN PATENT DOCUMENTS

| | | |
|---|---|---|
| FI | 101028 | 10/1996 |
| FI | 955675 | 5/1997 |
| JP | 09009308 | 1/1997 |
| WO | 96/32824 | 10/1996 |
| WO | 97/13381 | 4/1997 |
| WO | 97/20445 | 6/1997 |

OTHER PUBLICATIONS

"ETS 300 625"; European Telecommunication Standard, GSM: Digital cellular telecommunications system (Phase 2); Unstructured Supplemental Service Data (USSD)—Stage 1 (GSM 02.90 version 4.1.1), Valbonne, France, Sep. 1997.

Jun. 24, 1999, International Search Report for PCT/FI98/00995.

* cited by examiner

*Primary Examiner*—William Trost
*Assistant Examiner*—Philip J. Sobutka
(74) *Attorney, Agent, or Firm*—Squire, Sanders & Dempsey LLP

(57) ABSTRACT

When the user lifts the receiver, the terminal of a wireless local loop telephone system detects this and generates a dial tone as normally. The user starts dialing. But instead of waiting for completion of dialing, the terminal immediately sends a channel request message to the network. This triggers the exchange of normal messages with the result that a signaling channel is assigned, an authentication procedure is performed and the ciphering mode is set up during the time when the user is pressing keys to give a called subscriber's telephone number. Because dialing is still in process and the called subscriber's number is not yet available, the terminal puts a predetermined pseudonumber into a message which normally carries the called subscriber's number. The pseudonumber informs the network that the terminal will send the telephone number of the called subscriber later. The number will arrive as DTMF digits on the assigned signaling channel.

12 Claims, 5 Drawing Sheets

METHOD FOR ACCELERATING CALL ESTABLISHMENT IN A RADIO COMMUNICATION SYSTEM

This application is a continuation of International application Ser. No. PCT/FI98/00995, filed Dec. 18, 1998.

FIELD OF THE INVENTION

The present invention relates generally to a call establishment in a radio communication system comprising subscriber terminals, at least one base station, and at least one telephone exchange, whereupon a part of the subscriber connection is formed by a radio path between the terminal and the base station.

BACKGROUND OF THE INVENTION

When building a telephone network, the installation of subscriber lines between the exchange and the subscriber terminals is not only expensive but also takes a considerable amount of time. One solution for saving costs is to replace the fixed subscriber loop between the exchange and a subscriber device with a radio connection. In this case the subscriber device for a fixed network is connected to a terminal which includes a radio transceiver. It converts an audio frequency signal into a radio frequency signal and sends it via a radio path to the base station, and correspondingly, converts a received radio frequency signal into an audio frequency signal.

This kind of solution can be based on a platform system which can be a cellular system as such or a modified cellular system. Together these solutions are referred to in this application as a WLL system (Wireless Local Loop System).

The principle of a WLL system based on a modified cellular system is illustrated in FIG. 1. A wireless fixed terminal T comprises a radio part equipped with an antenna and a telephone adapter 4, which connects a standard subscriber device 5 to the terminal. The user can use the subscriber device 5 just as it would be used in a normal fixed network, even though the main part of the subscriber line connection is formed by using a radio connection between the terminal device T and the base transceiver station (BTS) 2. The subscriber device can also be a normal mobile station 6 of the system to which the WLL has been adapted. Each base station can serve several subscriber devices. The base stations are connected to a special network element 1 called an access node, which in turn is connected to a standard telephone exchange.

The access node 1 can be connected to the local exchange with an open V2 or V5.1 multiplexer connection, which uses a 2 Mb/s PCM system. If the local exchange only supports a 2-wire interface, the access node is connected to the switch with a multiplexer with the purpose of converting the V2 signaling into an analog 2-wire subscriber interface. The signaling between the access node and the base stations is the signaling of an applied mobile phone network, but it has been modified in such a manner that the functions typical of a cellular network, such as cell handover and roaming, are not possible. This means that the subscriber must stay within the assigned coverage area. The routing of incoming and outgoing calls is based on the subscriber file of the network element.

The WLL system adapted from a cellular system can be built by using the structural parts of an existing cellular system. A mobile phone system can be an analog or a digital system. In this case the signaling in the WLL system conforms to the signaling in the cellular system, the base stations are the standard base stations of the cellular system, and the radio unit of a terminal is similar to the radio part of a mobile station, or the terminal device may be a mobile station of the mobile phone system as such. In the latter case, the terminal device and the subscriber device (phone) have been combined into one physical device.

An important network element of the WLL system is the access node. In a pure cellular system this element is a mobile services switching centre, and in an applied system it is a network element described previously in this application. The access node converts the signaling of the WLL system into signaling suitable for a fixed network and correspondingly adapts the signaling of the fixed network for the interface of the WLL network.

FIG. 2 depicts the main elements in a cellular network. It comprises a plurality of mobile services switching centres MSC. Each MSC can establish connections both to other centers and to other telecommunications networks. Several base station controllers BSC are connected to the MSC. One BSC controls a plurality of base stations BTS. A network management system collects information on the network and configures the network elements. The cellular network also includes databases. A home location register HLR stores permanent subscriber data such as subscriber service data and routing information in a visitor location register VLR. The VLR receives subscriber data from the HLR and stores it for the time when the subscriber is visiting in that VLR area.

A cellular network is well suited for a WLL network. The subscriber data in the HLR includes the information that the subscriber is a WLL subscriber. Further, information about the cell or cells where the subscriber is allowed to reside is also included in the subscriber data. These cells are called the home cell and only in these cell areas the subscribers have the right to make and receive calls. In FIG. 2, WLL terminal 21 can operate in cell A only.

It was mentioned previously in this application that signaling in the WLL system conforms to the signaling in the cellular system. Accordingly, the call establishment procedure in the WLL system follows that of the cellular system.

The line adapter in the terminal generates a dial tone when the receiver of the telephone connected to the terminal has been taken off the hook. If there is no service available, a busy tone is generated. When service is available, the dial tone is generated, and the user can start dialing. During the dialing the dialed digits, either in DTMF (Dual Tone Multifrequency) format or in pulse code format, are converted into digital format and stored in a buffer. When it is ascertained that the dialing has been completed, the contents of the buffer are sent to the transceiver. After this, a special SEND signal is given to the transceiver of the terminal to send the first message to the network. This triggers a normal call initiation procedure according to the mobile phone network used.

If the WLL system is based on the GSM system, the messages exchanged between the terminal and the network are the same as in GSM. FIG. 3 depicts messages between the terminal and the network. As the first step, the terminal requests a signaling channel by sending the message "Channel Request". Then the network searches for a free channel, and when one is located it sends the information about it to the terminal in the message "Immediate Assignment". After that the network authenticates the terminal by receiving the right response to the message "Authentication Request". Then the network commands the terminal to cipher the signaling and the subsequent speech information, and the terminal gives notice of compliance in the message "Cipher Mode Complete". In the ciphered mode the network sends a temporary number called TMSI (Temporary Mobile Subscriber Identity) to the terminal, which acknowledges this in the return message "TMSI Reallocation Complete".

It is only now that the terminal sends the dialed phone number in the message "Setup". In response to that message, the network sends to the calling terminal the message "Call Proceeding", which indicates that the requested access connection establishment has been initiated. After a traffic channel has been allocated, the network sends the message "Assignment Command", which informs the terminal of the traffic channel to be used. The channel assignment is acknowledged in the message "Assignment Complete". After these messages, the mobile switching centre starts the connection establishment to the called subscriber, and when the connection is ready, the "Alert" message is sent to the terminal. The user can now hear an alerting tone. If the called subscriber answers, the message "Connect" informs the terminal that the call has been accepted by the called subscriber. The last message "Connect Acknowledge" indicates that the connection between the terminal and the called number is ready to for use be used.

In WLL systems the number analysis is performed in the exchange. In the fixed line network, the dialing information is transmitted to the exchange as the dialing proceeds. The dialed numbers are analyzed and the call is established right after the exchange ascertains that the dialing has been completed. In mobile phone networks the user dials the digits of a telephone number on the keypad or uses speed dialing and then depresses a special send key on the phone in order to transmit the dialed number information to the exchange.

In WLL systems there is no special "send" key in the terminal. Because of the lack of a send key, one of the basic problems in the WLL networks has been how to ascertain when dialing has been completed. Several solutions are known in the art. One common solution is to use a special end character that is dialed as the last character of the string. The character e.g. # or *, which is not normally used for dialing, tells the terminal that the dialing has now been completed and the number can be transmitted. Another common solution is to use time supervision. The dialed numbers are monitored constantly, and the elapsed time starting from the last dialed digit is counted. Whenever a key is depressed, the counter is reset and time counting is restarted. Whenever the counter reaches a predetermined value, it is supposed that the dialing is finished and the number can be transmitted. A time delay limit value commonly used is six seconds.

One drawback in WLL systems of prior art is that appreciable amount of time required between the moment of dialing is started and the moment the call has been accepted by the called subscriber. The time needed for exchanging the messages of FIG. 3 could be about 5 seconds, for example. If a predetermined delay is used to detect the end of dialing, this must be around 5 seconds in order to ensure that the SEND signal is not given to the transceiver before all the digits have been dialed. Hence, the total time is could be about 10 seconds, which is considerably longer, than in a fixed network.

The objective of this invention is to shorten the call establishment time. This is achieved by an accelerated call establishment method in accordance with the independent claims.

SUMMARY OF THE INVENTION

When the user picks up the phone, i.e. lifts the receiver, the terminal detects this and generates a dial tone as normally. The user can now start dialing. But instead of waiting for the dialing to be completed, the terminal immediately sends a channel request message to the network. This triggers the exchange of normal messages with the result that a signaling channel is assigned, the authentication procedure is performed, and the ciphering mode is set. All this has been taking place during the time the user is still depressing keys to give the called subscriber's telephone number.

The terminal is ready to send a setup message, including the called subscriber's number to the network. Because of the dialing is still in process and the called subscriber's number is not yet available, the terminal provides a predetermined pseudonumber for the setup message.

After the network has received the setup message, it continues the normal call establishment procedure by sending the call proceeding message and assigning a traffic channel to the terminal. But it also recognizes by the pseudonumber that a connection to the called subscriber can not be established with this number. Moreover, the pseudonumber indicates to the network that the terminal will be sending the real telephone number later. The number will arrive as DTMF digits on the assigned signaling channel.

At the same time that the network is establishing the call connection so far as possible, the terminal is receiving the dialed digits into the buffer. When the terminal recognizes that the dialing has been accomplished, it converts the digits into DTMF format and starts to send the DTMF digits one by one to the network.

The exchange in the network collects the DTMF digits and performs a number: analysis in the normal way. Based on the analysis, a connection to the called subscriber is established, and the point to point connection between the subscribers is now ready for communication.

An alternative way to send the dialed digits to the network is to send them as a string if the WLL system allows this. In the GSM system this is possible by using a data operation called Unstructured Supplementary Service Data.

BRIEF DESCRIPTION OF THE DRAWINGS

The invention is described more closely with reference to the accompanying drawings, in which.

DETAILED DESCRIPTION OF THE INVENTION

Figure 1:
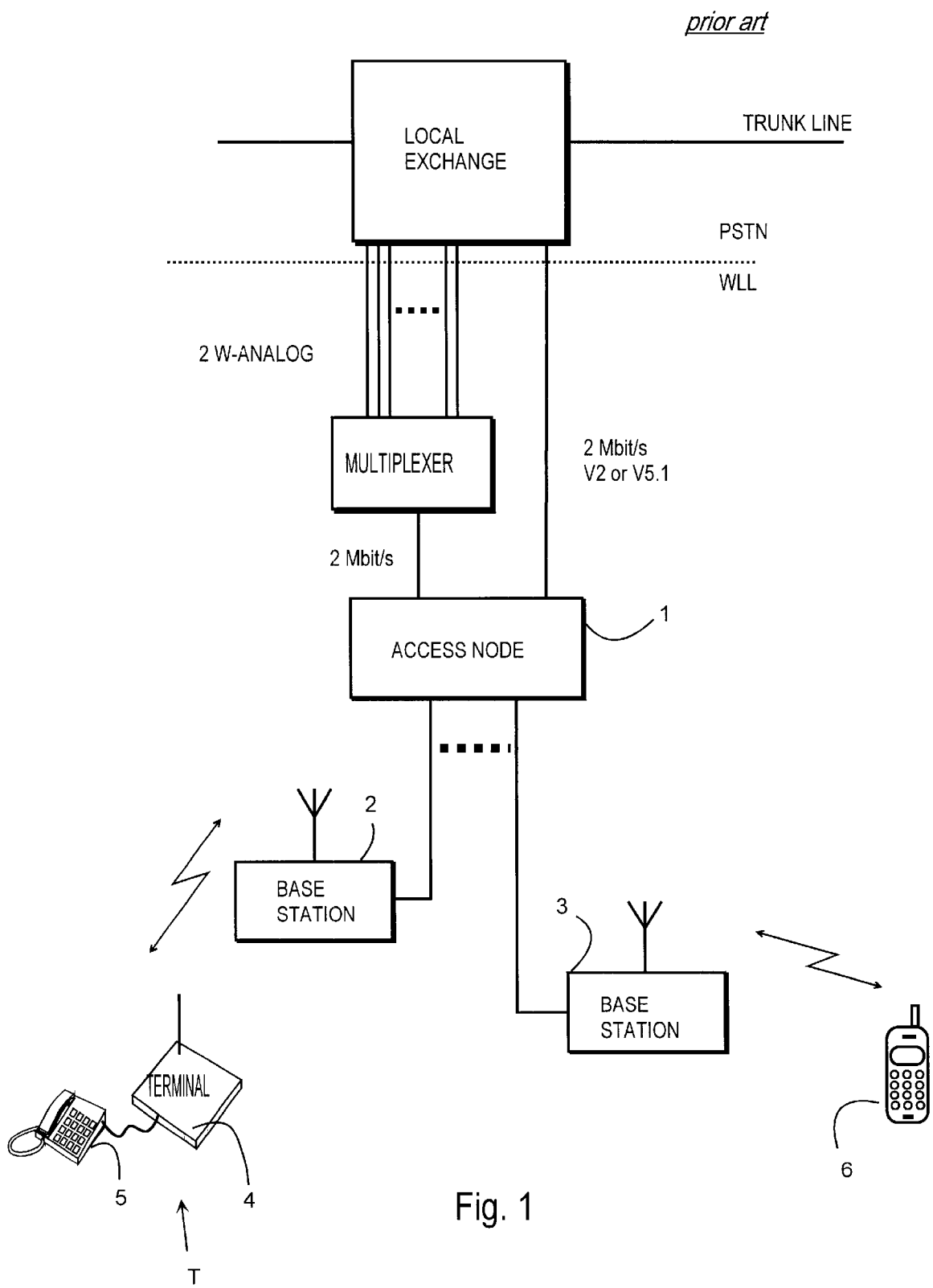
FIG. 1 shows the principle of a WLL system.
Figure 2:
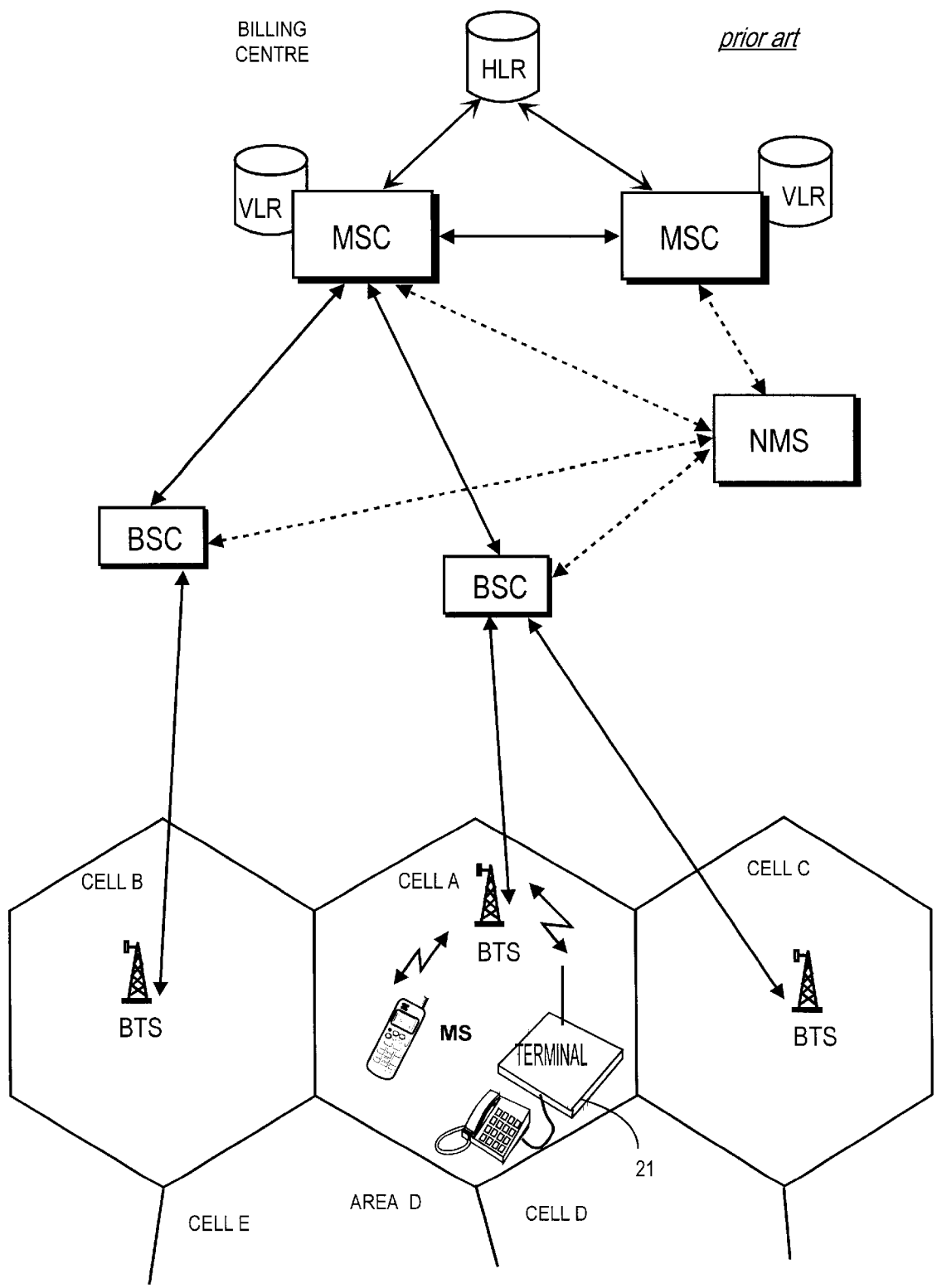
FIG. 2 shows a WLL system based on a cellular phone network.
Figure 3:
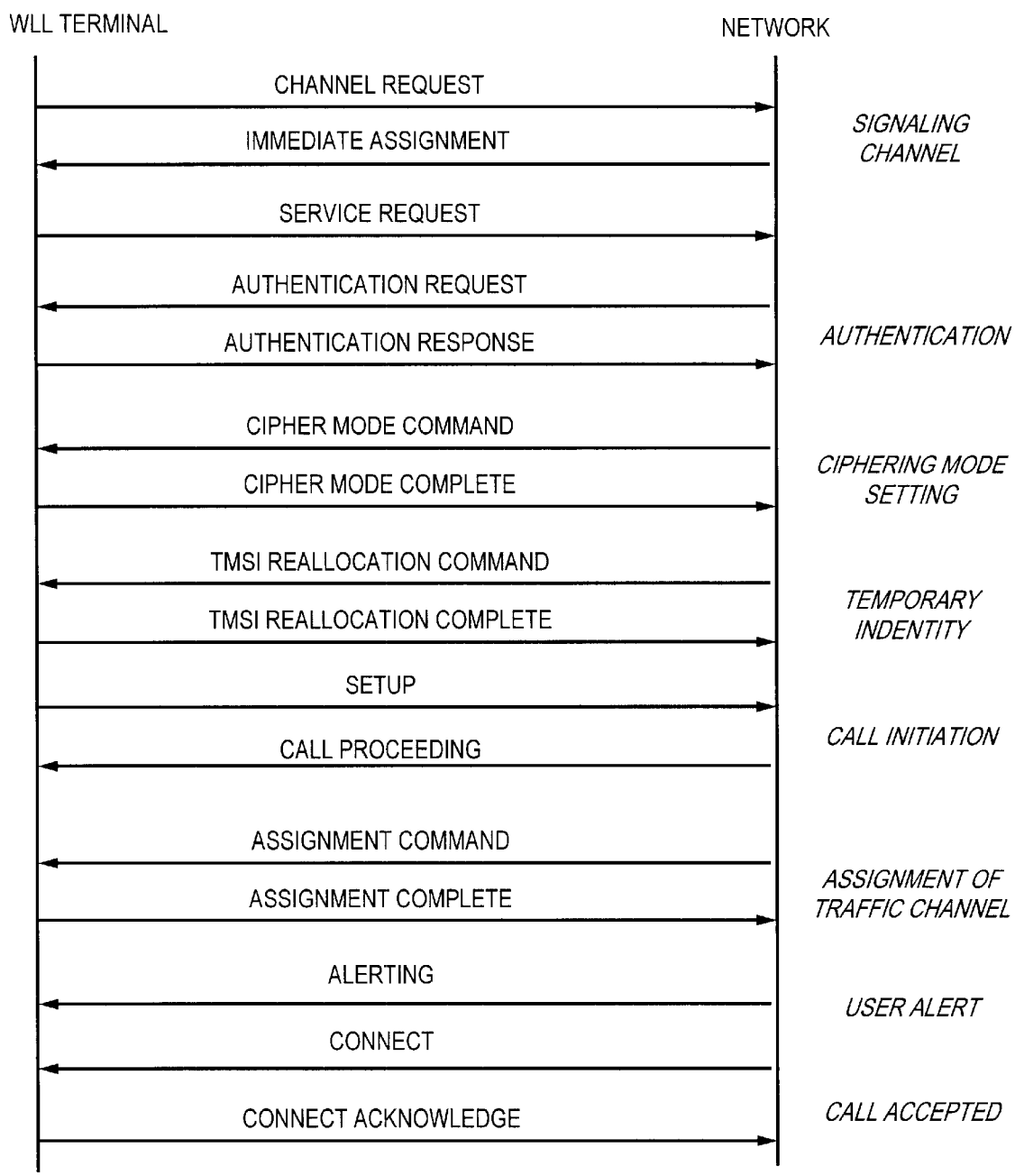
FIG. 3 illustrates transactions between a terminal and the network.
Figure 4:
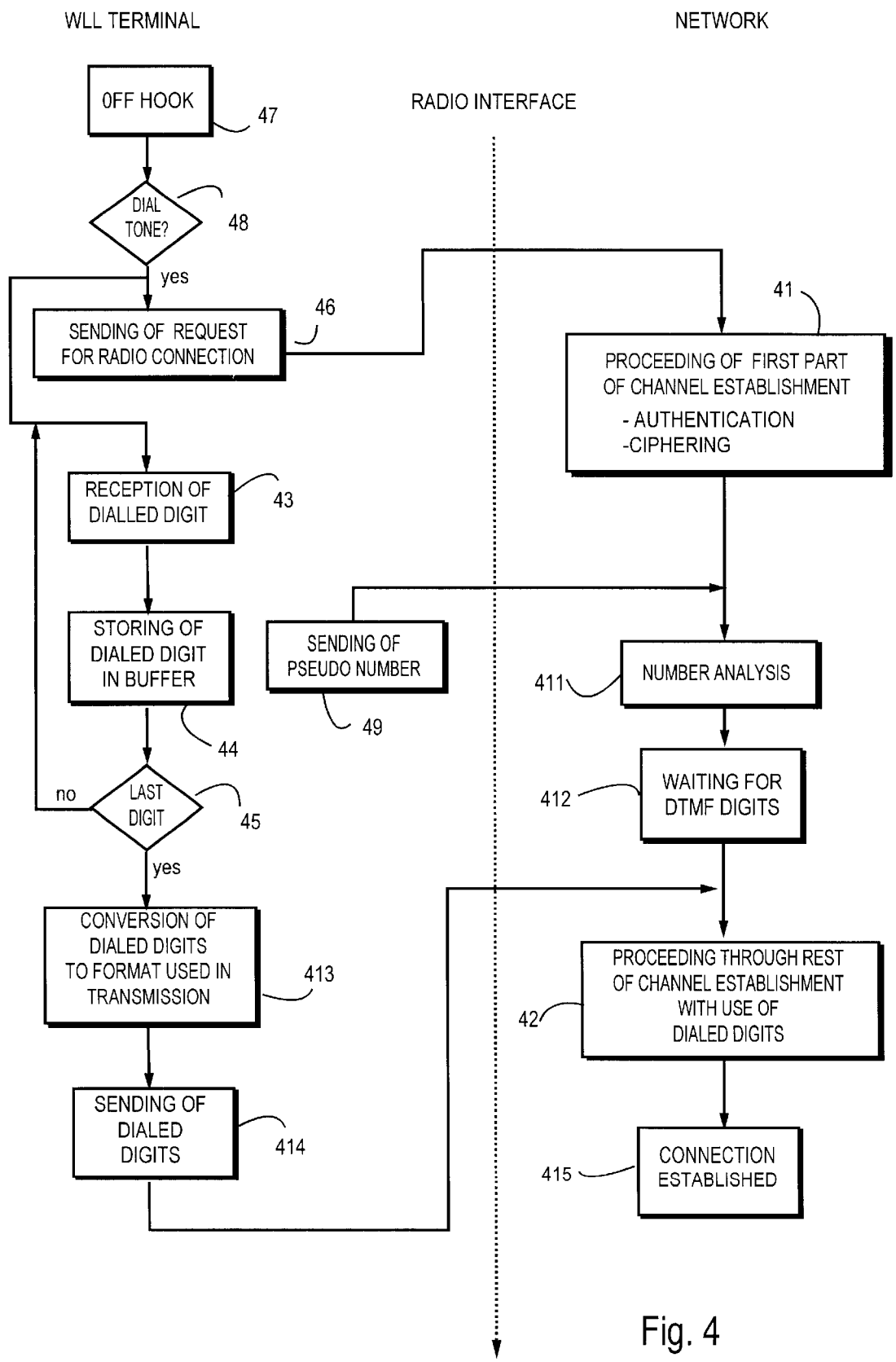
FIG. 4 illustrates the general principle of the invention.

The general principle of the invention is shown in FIG. 4. On the network side the call establishment procedure is divided into two parts. The procedure is carried out as far as possible in the stage 41. If the system requires the authentication of a terminal and some ciphering method is used, these tasks are done during stage 41. This stage starts after the terminal has sent a request for radio connection, stage 46. The request is sent immediately after the terminal has detected an off-hook state and given a dial tone, stages 47 and 48.

At the same time, that the call establishment procedure is being carried out, the terminal is collecting the digits dialed by the calling subscriber, stages 43, 44 and 45. The collected digits are stored in a buffer. Dialing can occur on a digit by digit basis or the subscriber can use abbreviated dialing. In the latter case the string of digits are fed in serial or parallel form into the buffer.

It should be noted that the terminal has sent the network its own identification in the channel request. Call establishment can be carried out only up to the point when the called subscriber's number is needed. Especially, when the user performs dialing by pressing keys subsequently, dialing has not yet been completed at the moment when the network needs the dialed number. Hence, the terminal must inform the network in some way as to how and when the network will have the dialed digits. For this purpose the terminal uses a message in which the called party's number is normally transmitted to the network. Instead of a B number It submits in that message a predetermined number. Henceforward the number is called a pseudonumber, stage 49.

After receiving the pseudonumber the network analyzes it, stage 411. In most cases this analysis is carried out by the exchange. The result of the analysis is the information first of that the exchange must wait for the called subscriber's number, secondly, that the terminal is sending the number as DTMF digits, and thirdly, that the transmission media is the signaling channel, stage 412. Alternatively, if the exchange detects, for instance on basis of the prefix of the pseudonumber, that the analysis is to be carried out by the intelligent network IN, it forwards the pseudonumber to the service control point SCP of the IN network. The SCP makes the analysis and informs the exchange what to do.

The number analysis is carried out so fast that after the network has returned an acknowledgment of having received the pseudonumber, the terminal is allowed to send DTMF digits. In response to the acknowledgment, the terminal fetches the dialed digits from the buffer and converts them into a format suitable for transmission, for example the DTMF format, in stage 413. After conversion the digits are sent to the network, stage 414. Conversion and transmission begin when the first digit has been dialed, even though the last digit has not yet been dialed.

When the network receives dialed digits, it proceeds with the rest of the call establishment procedure in a normal way, stage 415. At the end of the procedure, the connection between the subscribers is ready for communication.

Figure 5:
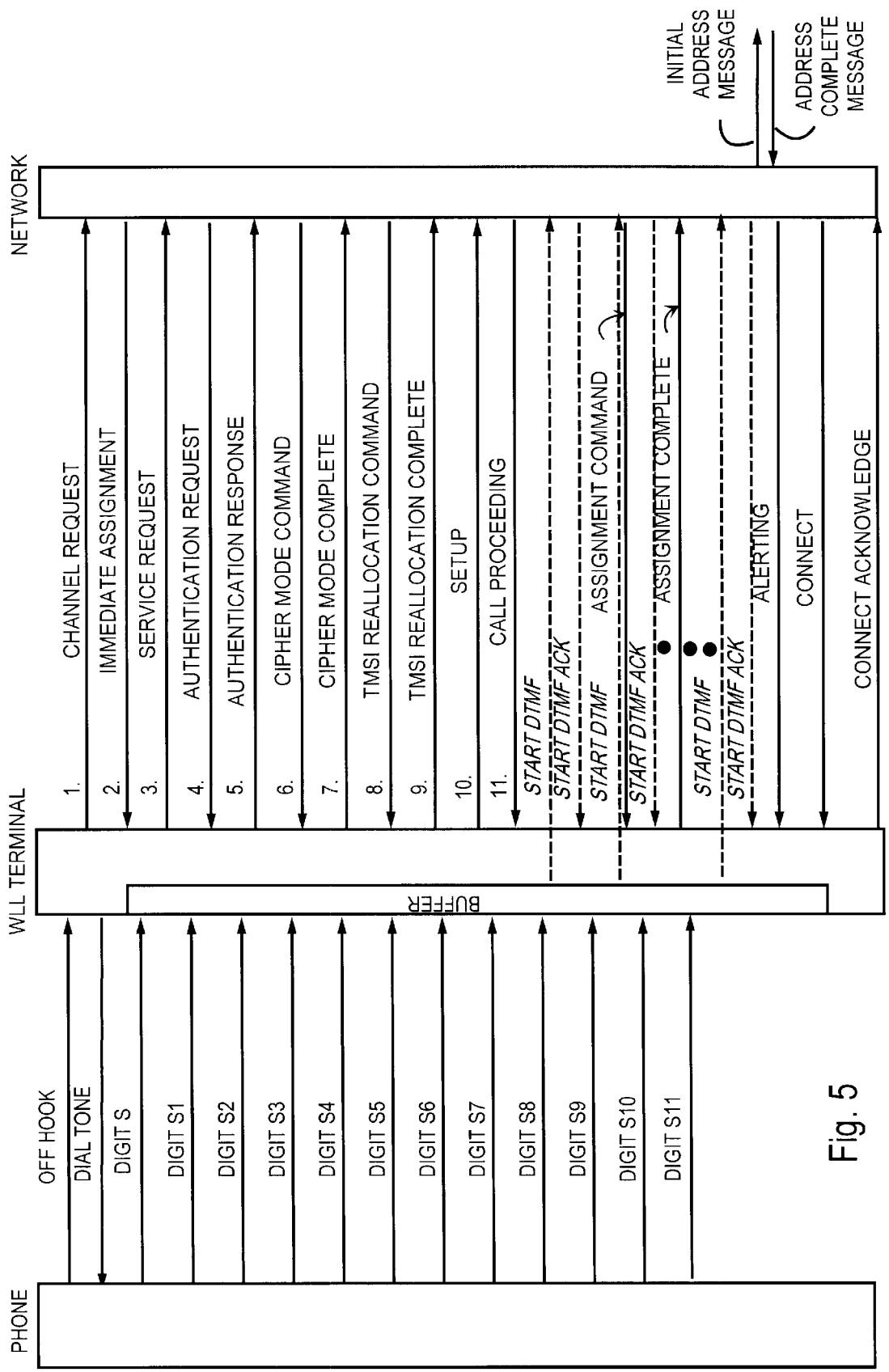
FIG. 5 illustrates transactions between the terminal and the network in the WLL system.

FIG. 5 is a practical example of the steps shown in FIG. 4. It is based on FIG. 4, with the addition of some extra signaling between the WLL terminal and the network. Further, messages between the telephone and the terminal after the user has picked up the phone are illustrated. In the following description, it is assumed that the GSM system has been adapted for the WLL system, and that the user gives the telephone number of a called party one by one by depressing keys on the telephone.

The terminal detects when the user picks up the receiver it and generates a dial tone as it normally does. Immediately after starting to generate the dial tone, the terminal sends the channel request message to the network. The message is denoted with the number 1 in FIG. 5. The network responds by assigning a signaling channel through which messaging will be transmitted. Thereafter normal transactions start between the terminal and the network.

At the same time that the messages 3 through 9 are transmitted between the terminal and the network, the user is dialing a telephone number by depressing the keys of the telephone one by one. In this example, the number consists of the digits Digit S, Digit S1 through Digit S11. The terminal also receives digits one by one and stores them temporarily in a buffer.

During the time when the user has been dialing the first digits, Digit S0 through Digit S6, the network has authenticated the terminal (messages 4 and 5), ciphering has been set up (messages 6 and 7), and a temporary number IMSI has been given to the terminal (messages 8 and 9). At this moment the network is ready to receive the called subscriber's telephone number in the setup message (message 10). But since dialing is still in process, the terminal sends a pseudonumber in the setup message. The pseudonumber can be any number not used for other purposes. Hence, after the setup message has been received by the network, more precisely by the mobile switching centre MSC, the number sequence is analyzed. Of course, the destination of the call can not yet be determined but analysis of the pseudonumber informs the MSC that the terminal will be sending the called subscriber's number in DTMF digits on the assigned signaling channel.

Another way to inform the MSC about forthcoming DTMF digits is to include this piece of information in the Visitor Location Register. When the MSC sends the pseudonumber instead of the called subscribers number in the setup message, pseudonumber the return message from the VLR informs the MSC that DTMF digits will be forthcoming.

Dual Tone Multifrequency (DTMF) is an inband one out of four plus one out of four signaling system. All Public Land Mobile Systems (PLMN) support DTMF. In GSM, the terminal sends a DTMF digit in a Start DTMF message and the network returns a Start DTMF Acknowledge message to the terminal. This acknowledgment is used by the network for successful transmission. If the network cannot accept the Start DTMF message, a Start DTMF Reject message is sent to the terminal.

Upon analyzing the setup message, the terminal sends the call proceeding message (11) to the terminal. This standard message tells the terminal that the MSC is now waiting for DTMF digits.

Reference is made here again to FIG. 5. In response to the call proceeding message, the terminal retrieves the first dialed digit "Digit S" from the buffer, converts it into the DTMF digit, and sends it in the Start DTMF message to the network. After the network has acknowledged the Start DTMF message, the terminal retrieves the next dialed digit, digit S1, from the buffer, makes the conversion, and sends the DTMF digit to the network. This process continues until the last dialed digit, digit S11, has been sent to the networks.

While the DTMF digits are being transmitted to the network and acknowledgments are being received, the terminal is also receiving the assignment command. This message informs the terminal of the traffic channel, which has been allocated to the terminal. After connection with the called party has been established, the terminal uses this channel for communication.

When the mobile switching centre has collected the DTMF digits needed to the analysis, it performs the number analysis in the normal way. Based on the analyzed sequence of the DTMF digits, a connection to the called subscriber is established. Establishment is performed in a well known way by transmission of a standardized Initial Address Message IAM to the exchange of the called subscriber. The exchange returns the acknowledgment message "Address Complete", indicating that the complete number called party has been received by the destination exchange. The network send an "Alert" message to the terminal and then a point to point connection between the subscribers is ready for communication.

It should be noted that the terminal can send DTMF digits even after the mobile switching centre has transmitted the IAM message. Prerequisite for this is, however, that the network uses signaling which supports that.

Alternatively the dialed digits can be sent to the network as a string if the WLL system has a feature allowing this. In the GSM system, this is possible by using a data operation called Unstructured Supplementary Service Data (USSD). This concept is described in detail in the specification ETS 300 625 published by the European Telecommunication Standards (ETSI). At any stage after the terminal has been registered with the network, the terminal may send an unstructured string to the network. The terminal may initiate an Unstructured SS Data operation, either during a call or in the idle mode. By using this known operation the terminal can send DTMF digits either in separate strings one by one each or all the DTMF digits can be placed to form one string, whereupon digits of the dialed number are sent simultaneously in one message.

In the description above, it is assumed that the user dials by depressing keys on by one. It is, of course, possible that the caller uses speed dialing. In that case the number is transferred as a whole to the terminal. The terminal can send the called number to the network digit by digit or in the USSD message.

What is claimed is:

1. A method of accelerating a call establishment procedure in a radio communication system comprising a telephone network comprising an exchange and at least one base station, a terminal with a transceiver and a subscriber device connected to the terminal,
    whereupon having received a message from the terminal with the request for a radio channel, the network performs the first part of the call establishment procedure, and having received the called subscriber's telephone number sent from the terminal, the network performs the latter part of the call establishment procedure, comprising the steps of:
        receiving and temporarily storing digits of the called subscriber's telephone number in a buffer of the terminal,
        sending to the network a message which includes a pseudonumber informing the network that the called subscriber's telephone number will be sent after the message, the pseudonumber is analyzed by a visitor location register,
        changing the state of an exchange in response to the pseudonumber,
        converting the stored digits into a format suitable for transmission on an assigned signaling channel,
        sending the converted digits to the network before all of the digits have been dialed, and
        receiving the called subscriber's telephone number at the network and proceeding through the latter part of the call establishment procedure to its termination.

2. The method as in claim 1, wherein as a response to the analyzed pseudonumber the network waits for receipt of the converted telephone number through the assigned signaling channel.

3. The method as in claim 1, wherein the called subscriber's telephone number is stored in a buffer digit by digit during dialing.

4. The method as in claim 1, wherein the called subscribers telephone number stored in the buffer is converted to Dual Tone Multifrequency (DTMF) format.

5. The method as in claim 1, wherein the converted telephone number is sent digit by digit to the network.

6. The method as in claim 1, wherein the converted telephone number is sent to the network in a single message.

7. The method as in claim 1, wherein during the first part of the call establishment procedure an authentication procedure is performed and a ciphering mode is set.

8. The method as in claim 1, wherein the visitor location register provides information to the exchange based on the pseudonumber.

9. The method as in claim 1, wherein an intelligent network provides information to the exchange based on the pseudonumber.

10. A method of accelerating a call establishment procedure in a radio communication system comprising a telephone network comprising an exchange and at least one base station, a terminal with a transceiver and a subscriber device connected to the terminal,
    whereupon having received a message from the terminal with the request for a radio channel, the network performs the first part of the call establishment procedure, and having received the called subscriber's telephone number sent from the terminal, the network performs the latter part of the call establishment procedure, comprising the steps of:
        receiving and temporarily storing digits of the called subscribers telephone number in a buffer of the terminal,
        sending to the network a message which includes a pseudonumber informing the network that the called subscriber's telephone number will be sent after the message,
        changing the state of an exchange in response to the pseudonumber,
        converting the stored digits into a format suitable for transmission on an assigned signaling channel,
        sending the converted digits to the network before all of the digits have been dialed,
        receiving the called subscriber's telephone number at the network and proceeding through the latter part of the call establishment procedure to its termination, and
        in the network in which the radio interface between the base station and the terminal is in accordance with that of the known GSM cellular telephone system, wherein the message including the pseudonumber is the ordinary setup message and the dialed digits are sent digit by digit in the start DTMF message.

11. The method as in claim 10, wherein a traffic channel is assigned during transmission of the called subscriber's number.

12. A method of accelerating a call establishment procedure in a radio communication system comprising a telephone network comprising an exchange and at least one base station, a terminal with a transceiver and a subscriber device connected to the terminal,
    whereupon having received a message from the terminal with the request for a radio channel, the network performs the first part of the call establishment procedure, and having received the called subscriber's telephone number sent from the terminal, the network performs the latter part of the call establishment procedure, comprising the steps of:
        receiving and temporarily storing digits of the called subscriber's telephone number in a buffer of the terminal,
        sending to the network a message which includes a pseudonumber informing the network that the called subscriber's telephone number will be sent after the message,
        changing the state of an exchange in response to the pseudonumber, converting the stored digits into a format suitable for transmission on an assigned signaling channel, sending the converted digits to the network before all of the digits have been dialed, receiving the called subscriber's telephone number at the network and proceeding through the latter part of the call establishment procedure to its termination, and in the network in which the radio interface between the base station and the terminal is in accordance with that of the known GSM cellular telephone system, wherein the message including the pseudonumber is the ordinary setup message and the dialed digits are sent in the Unstructured SS Data operation message.

* * * * *